(12) United States Patent
Morita et al.

(10) Patent No.: US 10,559,430 B2
(45) Date of Patent: Feb. 11, 2020

(54) POWER STORAGE MODULE

(71) Applicants: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-shi, Osaka (JP)

(72) Inventors: Kyohei Morita, Mie (JP); Tatsuya Sumida, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-Shi, Osaka (JP)

( * ) Notice: Subject to any disclaimer, the term of this patent is extended or adjusted under 35 U.S.C. 154(b) by 247 days.

(21) Appl. No.: 15/529,582

(22) PCT Filed: Nov. 25, 2015

(86) PCT No.: PCT/JP2015/082987
§ 371 (c)(1),
(2) Date: May 25, 2017

(87) PCT Pub. No.: WO2016/084820
PCT Pub. Date: Jun. 2, 2016

(65) Prior Publication Data
US 2017/0323736 A1 Nov. 9, 2017

(30) Foreign Application Priority Data
Nov. 26, 2014 (JP) .................................. 2014-238874

(51) Int. Cl.
*H01G 11/10* (2013.01)
*H01G 11/78* (2013.01)
(Continued)

(52) U.S. Cl.
CPC .............. *H01G 11/10* (2013.01); *H01G 2/06* (2013.01); *H01G 2/08* (2013.01); *H01G 11/14* (2013.01);
(Continued)

(58) Field of Classification Search
CPC ... H01M 10/0481; H01M 2/1217; H01G 2/08
See application file for complete search history.

(56) References Cited

U.S. PATENT DOCUMENTS

| 6,218,039 B1* | 4/2001 | Mease | H01M 8/247 |
| | | | 29/623.2 |
| 9,768,429 B2* | 9/2017 | Chung | H01M 2/1211 |

(Continued)

FOREIGN PATENT DOCUMENTS

| JP | 2007265658 A | 10/2007 |
| JP | 2010277736 A | 12/2010 |

(Continued)

*Primary Examiner* — Maria Laios
(74) *Attorney, Agent, or Firm* — Honigman LLP

(57) ABSTRACT

Provided is an electricity storage module including an electricity storage element group composed of multiple electricity storage elements having exhaust ports that discharge gas produced therein, and a cover attached to the electricity storage element group, wherein the electricity storage element group has exhaust surfaces on which the exhaust ports are arranged, and the cover is attached so as to cover the exhaust surfaces, guide walls that surround the exhaust ports in the form of loops are formed in the respective electricity storage elements, guide ribs that come into close contact with the guide portions and fit therein are formed on an opposing surface of the cover that opposes the exhaust surfaces, and the cover is provided with a duct that communicates with the exhaust ports and through which gas discharged from the exhaust ports passes.

8 Claims, 14 Drawing Sheets

(51) Int. Cl.
  *H01G 11/14* (2013.01)
  *H01M 10/04* (2006.01)
  *H01M 2/10* (2006.01)
  *H01G 11/82* (2013.01)
  *H01G 11/18* (2013.01)
  *H01G 2/08* (2006.01)
  *H01G 2/06* (2006.01)
  *H01M 2/12* (2006.01)
  *H01M 10/0525* (2010.01)
  *H01M 10/34* (2006.01)

(52) U.S. Cl.
  CPC ............. *H01G 11/18* (2013.01); *H01G 11/78* (2013.01); *H01G 11/82* (2013.01); *H01M 2/1077* (2013.01); *H01M 2/1252* (2013.01); *H01M 10/0481* (2013.01); *H01M 10/0525* (2013.01); *H01M 10/345* (2013.01)

(56) References Cited

U.S. PATENT DOCUMENTS

| | | | |
|---|---|---|---|
| 2011/0117401 A1 | 5/2011 | Lee et al. | |
| 2011/0262799 A1 | 10/2011 | Kim | |
| 2013/0236754 A1* | 9/2013 | Lim | H01M 2/1077 429/82 |
| 2013/0330579 A1 | 12/2013 | Ejiri et al. | |
| 2015/0125720 A1* | 5/2015 | Fujii | H01M 2/1077 429/56 |

FOREIGN PATENT DOCUMENTS

| | | |
|---|---|---|
| JP | 2011108653 A | 6/2011 |
| JP | 2011228272 A | 11/2011 |
| WO | 2012131837 A1 | 10/2012 |
| WO | 2014024433 A1 | 2/2014 |
| WO | WO-2014024433 A1 * | 2/2014 ......... H01M 2/1077 |

* cited by examiner

FIG. 12
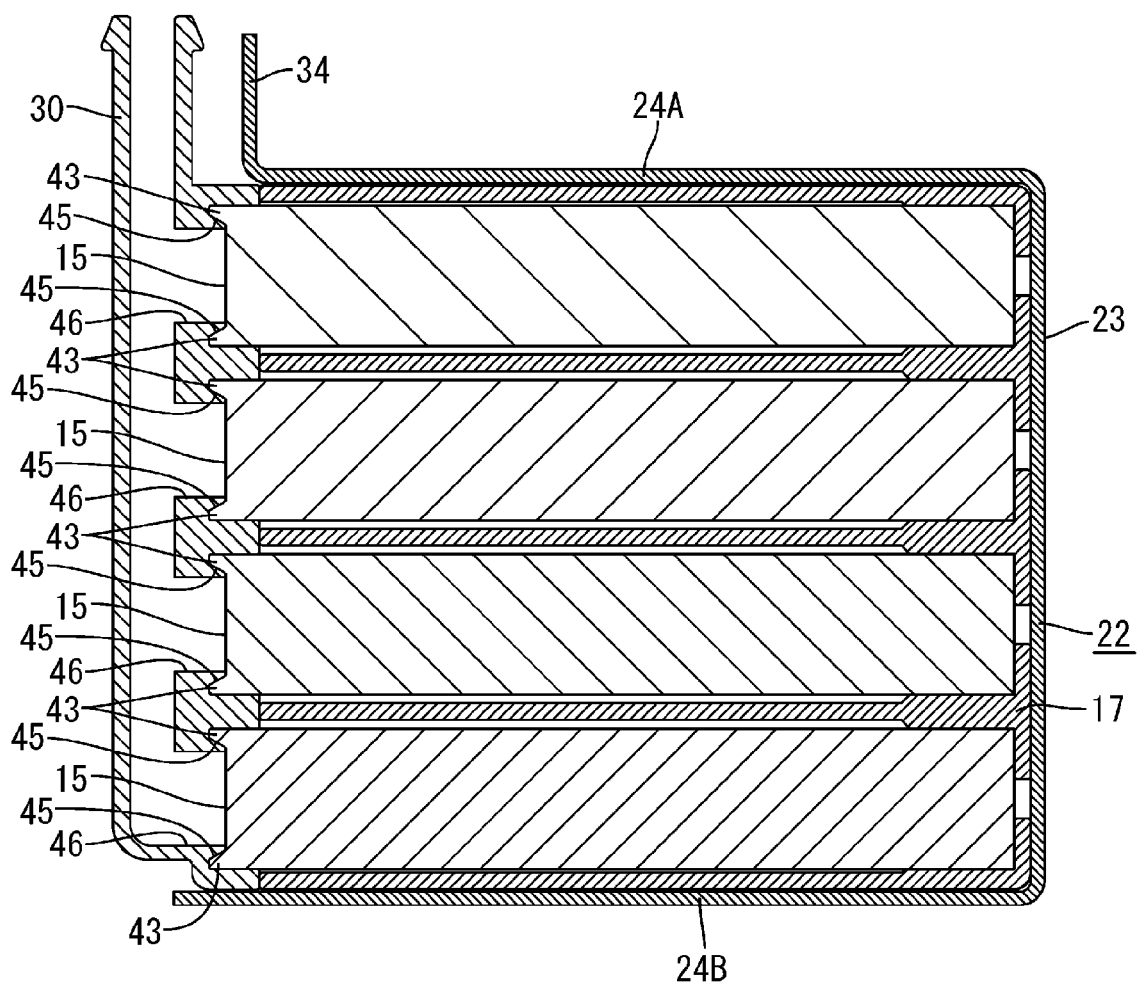
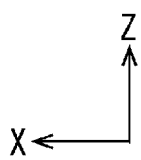

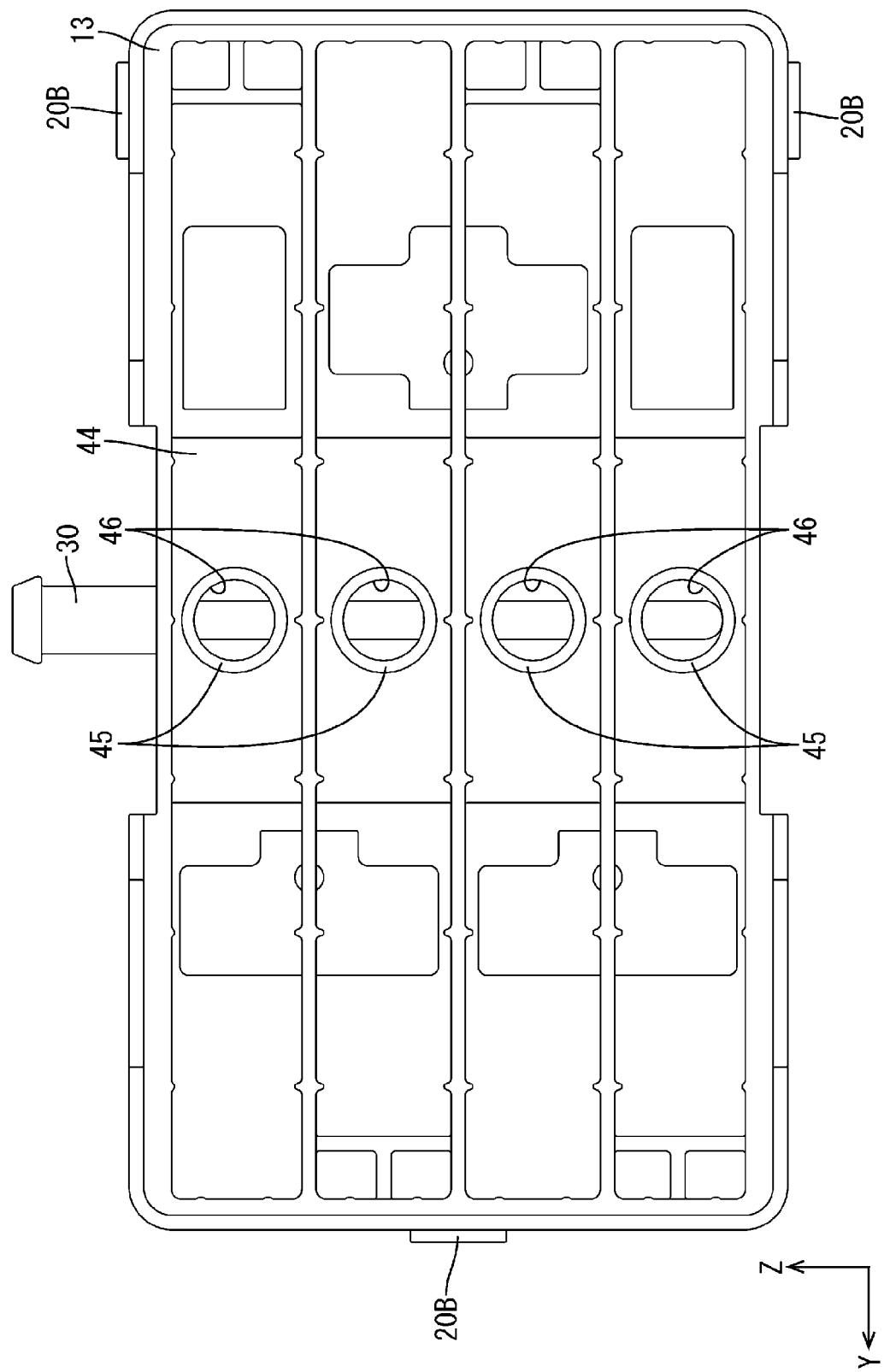

POWER STORAGE MODULE

CROSS-REFERENCE TO RELATED APPLICATIONS

This application is the U.S. national stage of PCT/JP2015/082987 Nov. 25, 2015, which claims priority of Japanese Patent Application No. JP 2014-238874 filed Nov. 26, 2014.

TECHNICAL FIELD

The present invention relates to an electricity storage module.

BACKGROUND

Conventionally, an electricity storage module disclosed in JP 2011-108653A has been known as an electricity storage module having a single-cell battery group composed of multiple single-cell batteries. A duct through which gas produced by electricity storage elements passes is attached to the single-cell battery group of the electricity storage module.

A vent for discharging gas produced in the electricity storage elements is formed in the electricity storage element. A gap between the vent and the duct is sealed by a sealing member.

However, according to the above-described technique, since the gap between the vent and the duct is sealed by the sealing member, the number of parts is higher and the production cost increases.

The present invention has been completed based on the above-described circumstances, and aims to provide an electricity storage module with a reduced production cost.

SUMMARY OF THE INVENTION

The present invention is an electricity storage module including: an electricity storage element group composed of a plurality of electricity storage elements having exhaust ports that discharge gas produced therein; and a cover attached to the electricity storage element group, wherein the electricity storage element group has exhaust surfaces on which the exhaust ports are arranged, and the cover is attached so as to cover the exhaust surfaces, guide portions that surround the exhaust ports in the form of loops are respectively formed in the plurality of electricity storage elements, guided portions that come into close contact with the guide portions are formed on an opposing surface of the cover that opposes the exhaust surfaces, and the cover is provided with a duct that communicates with the exhaust ports and through which gas discharged from the exhaust ports passes.

According to the present invention, the gap between the guide portion and the guided portion is sealed by bringing the guide portion and the guided portion into close contact with each other and fitting them together. Accordingly, it is not necessary to separately provide a member for sealing the guide portion and the guided portion, and therefore the number of parts can be reduced. As a result, it is possible to reduce the production cost of the electricity storage module.

The following aspects are preferable as embodiments of the present invention.

It is preferable that a pressing member that presses the cover toward the electricity storage element group is attached to the cover.

According to the above-described aspect, the guided portion can reliably be brought into close contact with the guide portion, and therefore the property of sealing the gap between the guide portion and the guided portion can be improved.

It is preferable that the electricity storage element group is formed by the plurality of electricity elements being aligned in an alignment direction, and a pressurizing member that pressurizes the plurality of electricity storage elements in the alignment direction is attached to the electricity storage element group.

According to the above-described aspect, if gas is produced in the electricity storage element and the internal pressure increases, it is possible to use the pressurizing member to suppress a case in which the electricity storage element swells.

It is preferable that a pressing member that presses the cover toward the electricity storage element group is attached to the cover, the electricity storage element group is formed by the plurality of electricity elements being aligned in an alignment direction, and a pressurizing member that pressurizes the plurality of electricity storage elements in the alignment direction is attached to the electricity storage element group, and one of the pressing member and the pressurizing member is provided with an engaging portion, the other is provided with an engagement hole, and the engaging portion elastically engages with a hole edge portion of the engagement hole.

According to the above-described aspect, the pressing member and the pressurizing member are elastically engaged, and therefore it is possible to reliably press or pressurize the power storage element group.

According to the present invention, it is possible to reduce the production cost of the electricity storage module.

BRIEF DESCRIPTION OF DRAWINGS

FIG. 12 is a cross-sectional view showing a structure of a duct, guide ribs, and guide walls.

FIG. 15 is a rear view showing a cover.

DETAILED DESCRIPTION OF THE PREFERRED EMBODIMENTS

Embodiment 1

Embodiment 1 of the present invention will be described with reference to FIGS. 1 to 15. An electricity storage module 10 according to the present embodiment includes an electricity storage element group 12 composed of multiple electricity storage elements 11, and a cover 13 that is attached to the electricity storage element group 12. The electricity storage module 10 is used as a power source or an auxiliary power source in a vehicle such as an automobile, an electric automobile, or a hybrid car. Note that in the following description, the Z direction is upward, the Y direction is rightward, and the X direction is frontward.

Note that the above-described directions are used for convenience in the description of the embodiment, and the electricity storage module 10 can be attached in any orientation to a vehicle.

Figure 1:
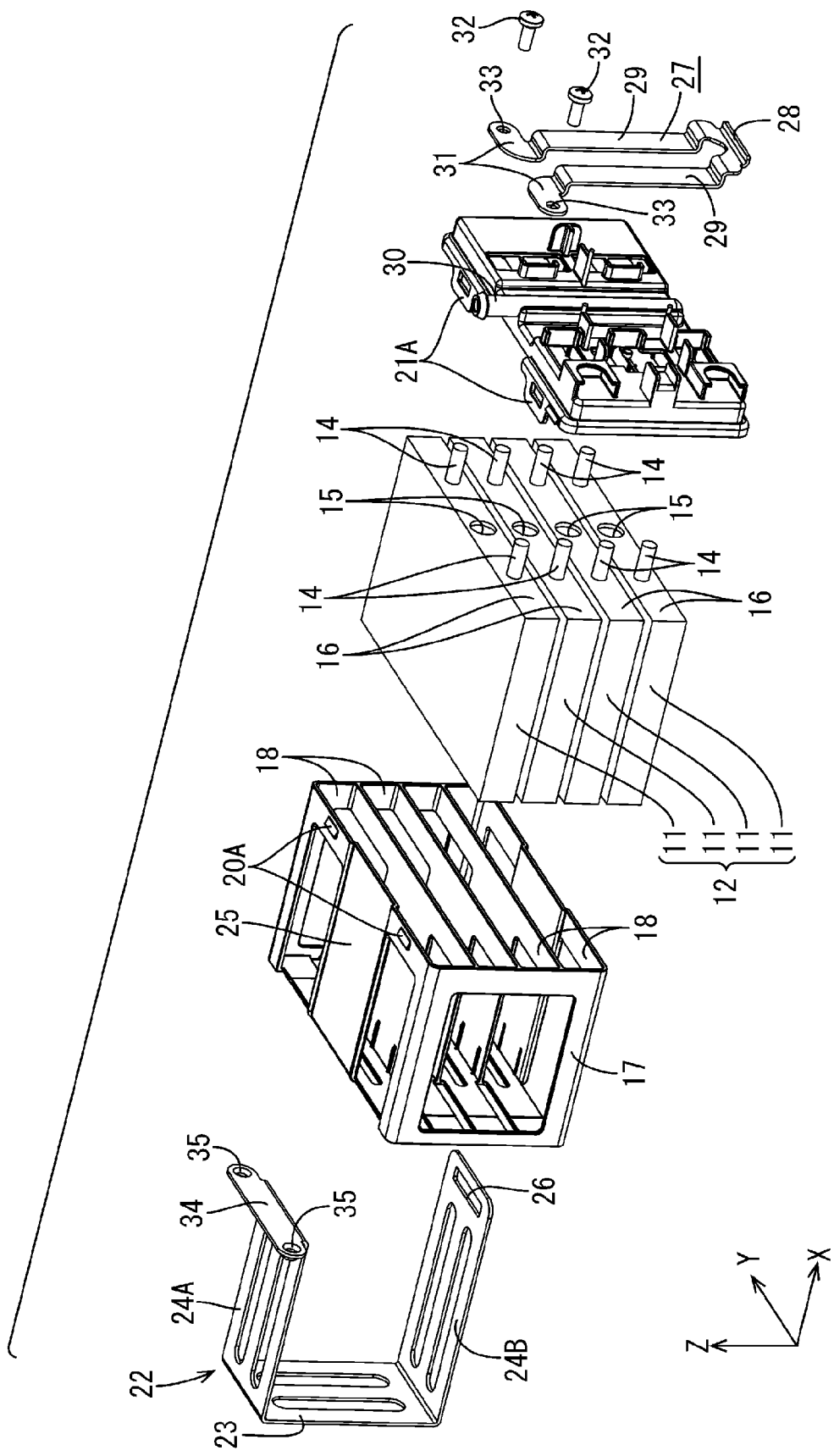
FIG. 1 is an exploded perspective view showing a pressurizing member, a holding case, an electricity storage element group, a cover, and a pressing member in an electricity storage module according to Embodiment 1.

As shown in FIG. 1, the electricity storage element 11 has a flat cuboid shape. Each electricity storage element 11 has a pair of electrode terminals 14 composed of a cathode and an anode. The electrode terminals 14 are formed so as to protrude from a surface of the electricity storage element 11, and an exhaust port 15 for discharging gas produced in the electricity storage element 11 is formed between the pair of electrode terminals 14. The surfaces of the electricity storage elements 11 on which the air discharge ports 15 are formed are exhaust surfaces 16. In the present embodiment, the pairs of electrode terminals 14 are formed on the exhaust surfaces 16.

Any electricity storage element, such as a lithium ion capacitor, a lithium ion secondary battery, an electric double layer capacitor, or a nickel-hydrogen secondary battery, can be used as the electricity storage element 11 according to need. In the present embodiment, a lithium ion capacitor is used.

The multiple electricity storage elements 11 are held in a holding case 17 made of synthetic resin. The holding case 17 is formed by aligning multiple (in the present embodiment, four) cavities 18 for storing the electricity storage elements 11 in the vertical direction (alignment direction). Openings are formed on the front sides of the cavities 18. The electricity storage elements 11 are stored in the cavities 18 from the front. The electricity storage elements 11 are arranged in an orientation in which the exhaust surfaces 16 face frontward when stored in the cavities 18.

Figure 2:
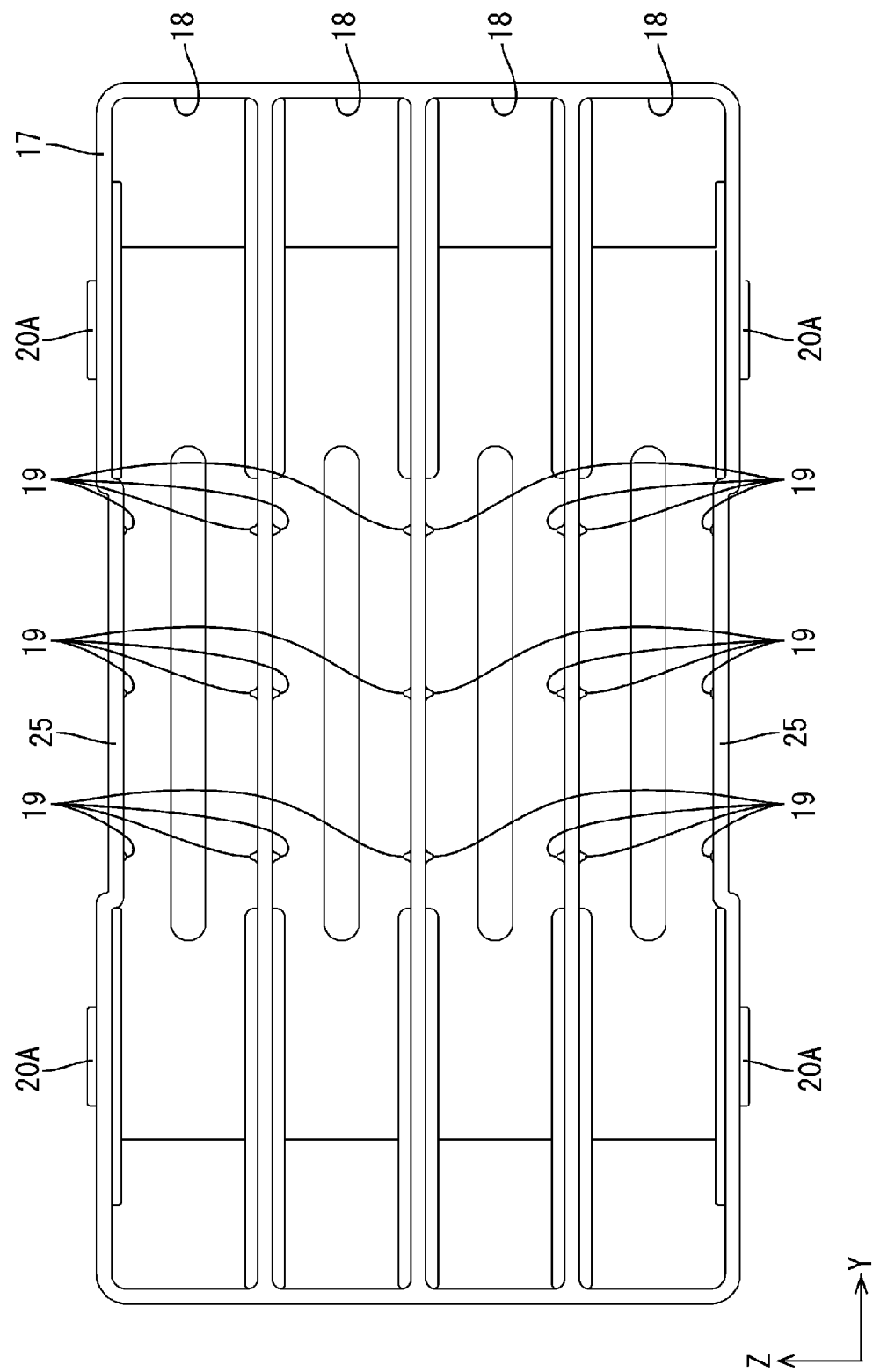
FIG. 2 is a front view showing a holding case.

As shown in FIG. 2, multiple ribs 19 that protrude inward in the cavities 18 are formed on the inner walls of the cavities 18. The ribs 19 are formed extending in the front-rear direction. Multiple batteries are held in a state of being positioned in the cavities 18 while the outer surfaces thereof are in contact with the ribs 19.

Figure 3:
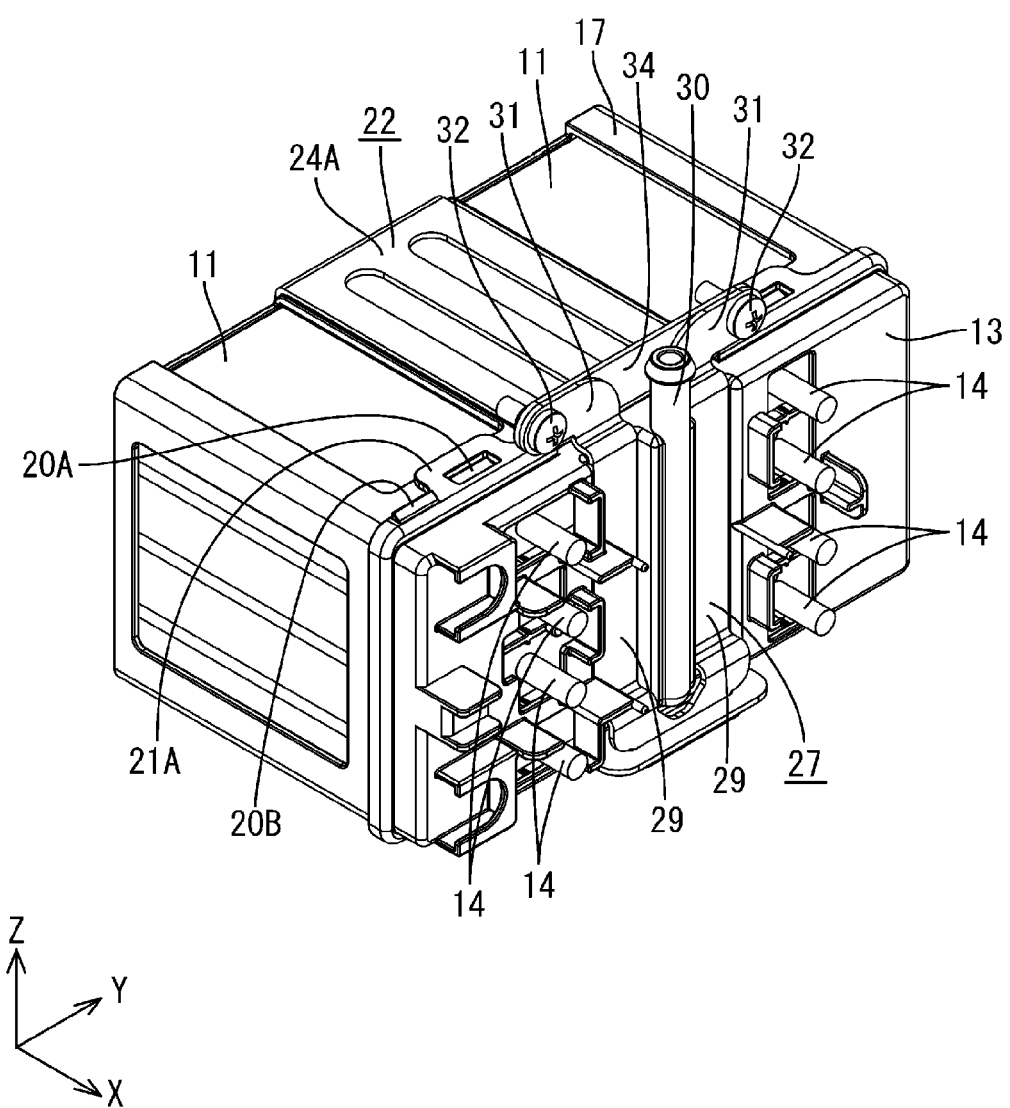
FIG. 3 is a perspective view showing a state in which a pressurizing member, a holding case, an electricity storage element group, a cover, and a pressing member have been assembled.
Figure 4:
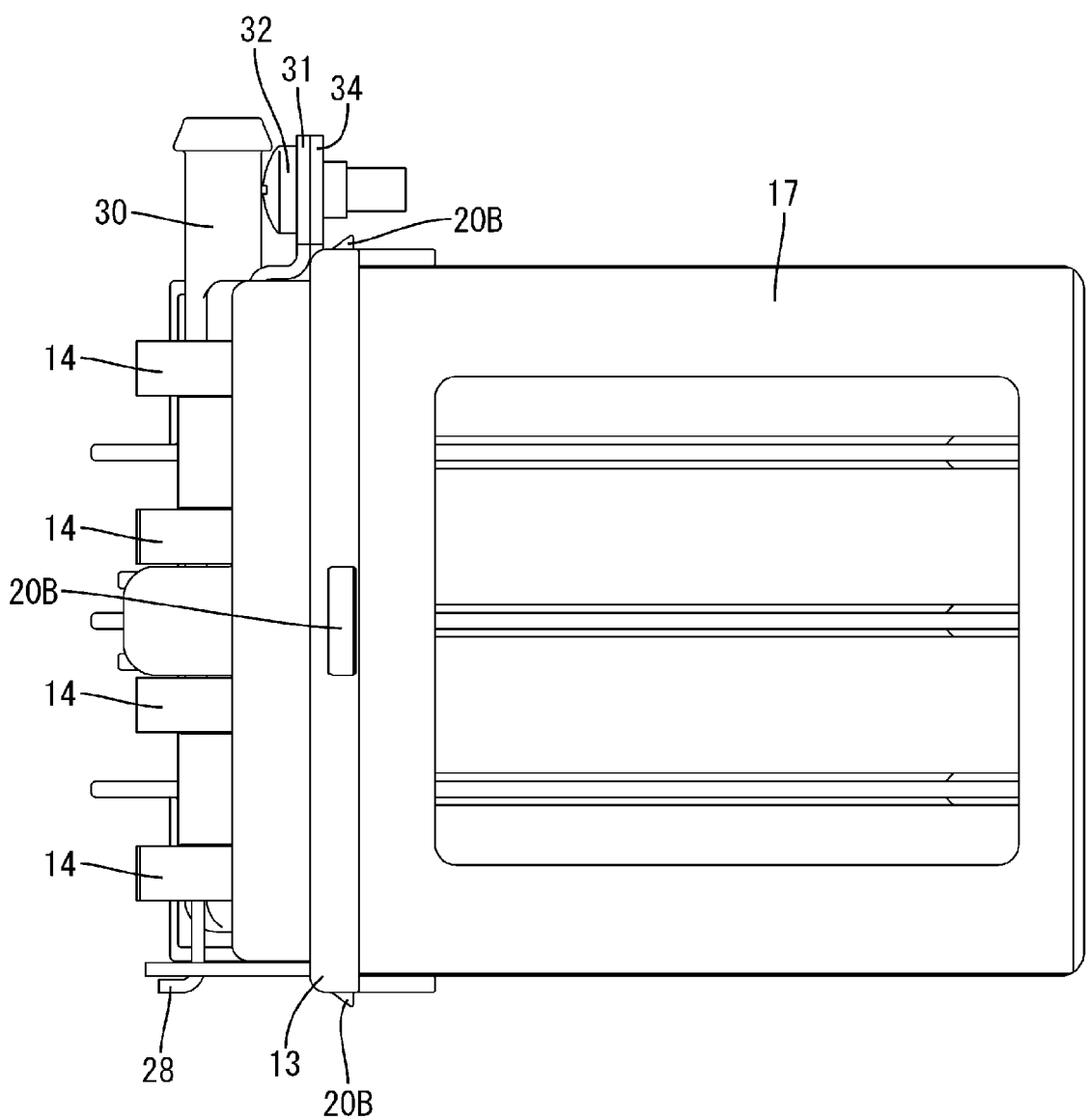
FIG. 4 is a side view showing a state in which a pressurizing member, a holding case, an electricity storage element group, a cover, and a pressing member have been assembled.
Figure 5:
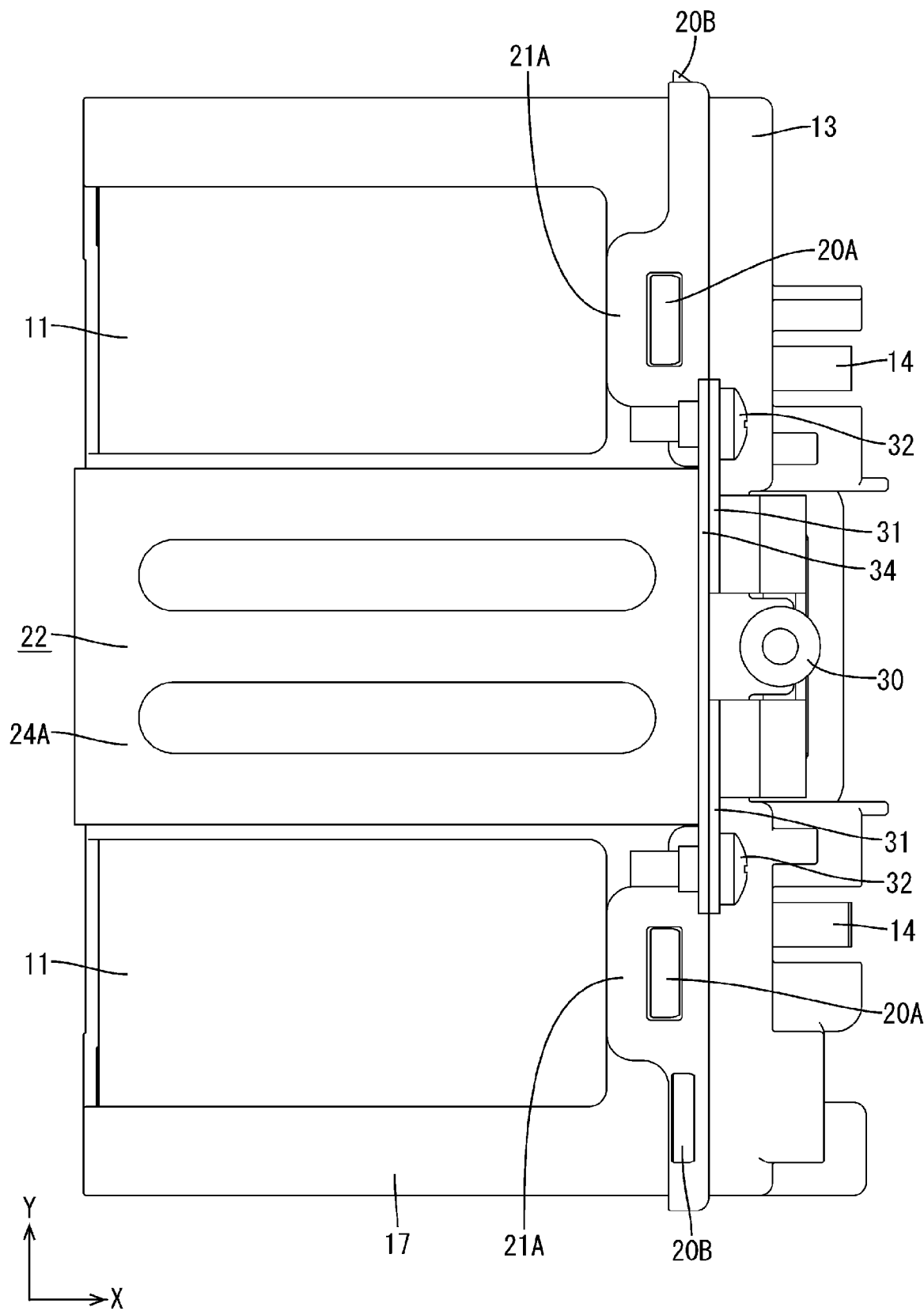
FIG. 5 is a plan view showing a state in which a pressurizing member, a holding case, an electricity storage element group, a cover, and a pressing member have been assembled.

As shown in FIGS. 3 to 5, a cover 13 made of synthetic resin is attached to a surface on the front side of the holding case 17. The cover 13 has a shape that corresponds to the front surface of the holding case 17, and covers the front surface of the holding case 17 when attached to the holding case 17.

Lock portions 20A are formed on the outer surface of the holding case 17 at positions near the front end portion. Locked portions 21A that elastically engage with the lock portions 20A are formed at positions on the cover 13 that correspond to the lock portions 20A. Due to the lock portions 20A and the locked portions 21A engaging elastically, the cover 13 is assembled on the holding case 17.

A pressurizing member 22 made of metal is assembled on the holding case 17 from the rear. The pressurizing member 22 is plate-shaped and includes a base portion 23 that is elongated in the vertical direction, and elongated pressurizing portions 24A and 24B that extend forward from both vertical end portions of the base portion 23.

Pressurized portions 25 that come into contact with the pressurizing portions 24A and 24B of the pressurizing member 22 are formed on both the upper and lower surfaces of the holding case 17. Due to the pressurized portions 25 being sandwiched in the vertical direction by the pressurizing portions 24A and 24B, pressure in the vertical direction is applied to the pressurized portions 25, and due to this pressure, a force is applied to the electricity storage elements 11 in the vertical direction.

Figure 6:
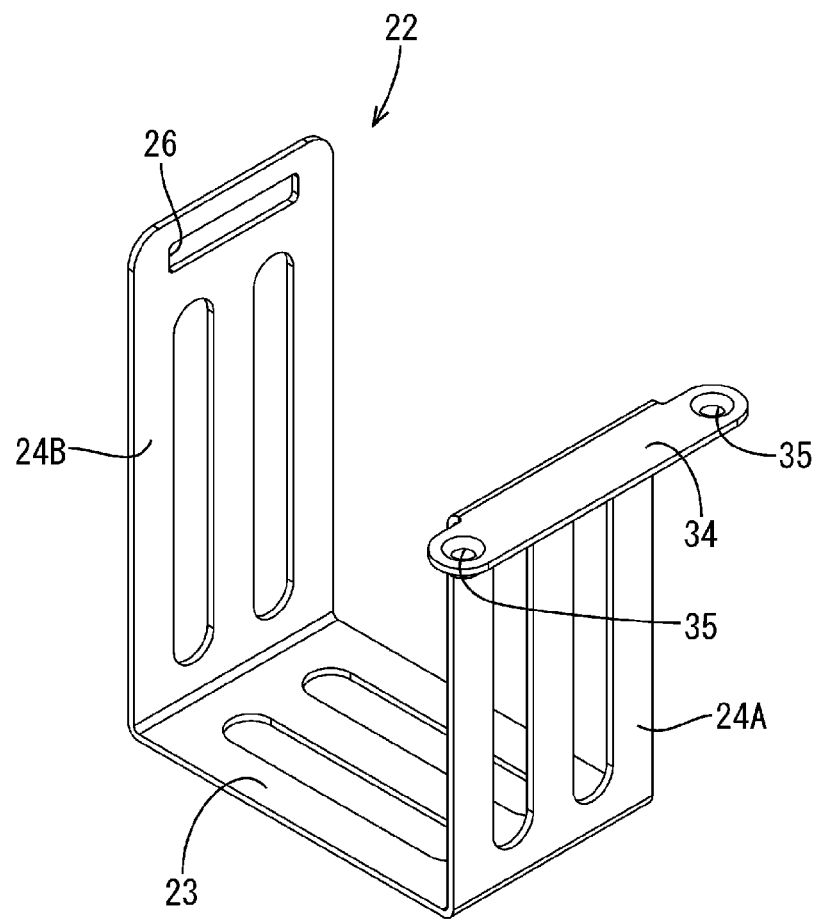
FIG. 6 is a perspective view showing a pressurizing member.

As shown in FIG. 6, among the pressurizing portions 24A and 24B, an engagement hole 26 is formed through the front end portion of the lower-side pressurizing portion 24B located on the lower side. An engaging portion 28 formed on the pressing member 27 made of metal engages with the engagement hole 26. After being inserted into the engagement hole 26 from above, the engaging portion 28 comes into contact with the hole edge portion of the engagement hole 26 from below. Accordingly, the pressing member 27 and the pressurizing member 22 are elastically engaged.

Figure 7:
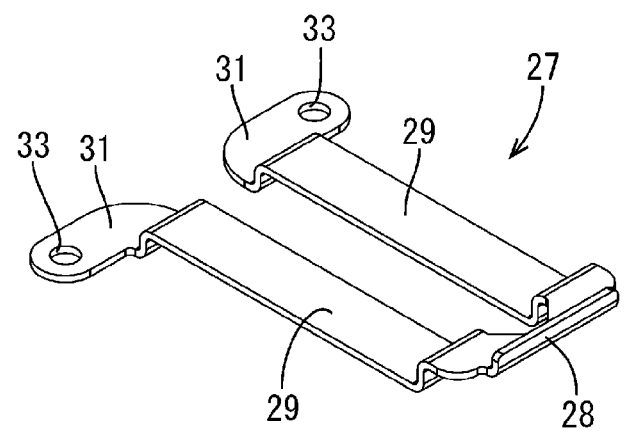
FIG. 7 is a perspective view showing a pressing member.
Figure 8:
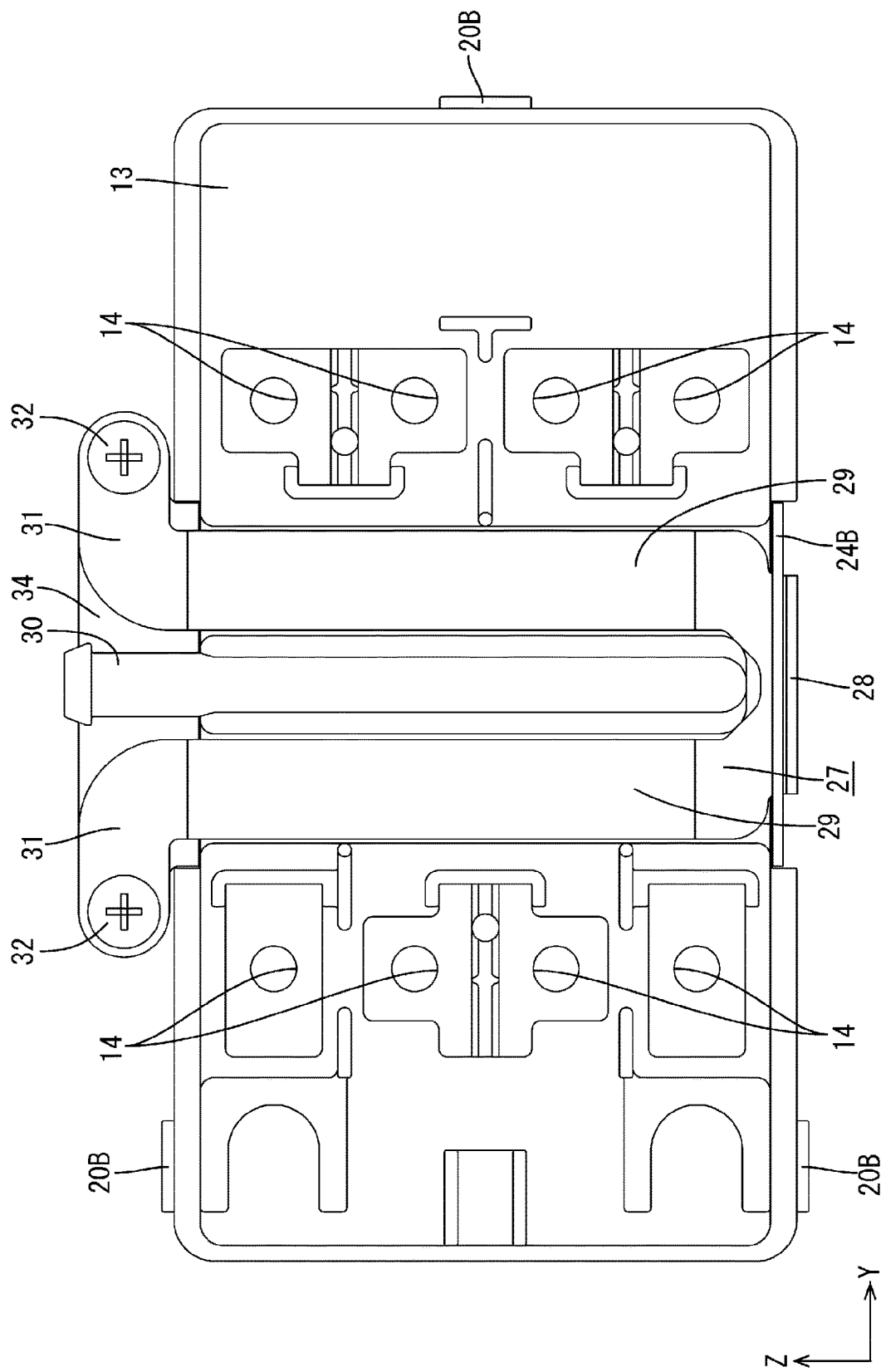
FIG. 8 is a front view showing a state in which a pressurizing member, a holding case, an electricity storage element group, a cover, and a pressing member have been assembled.

As shown in FIG. 7, the pressing member 27 is assembled on the cover 13 from the front of the cover 13. The pressing member 27 includes pressing portions 29 that branch from each other at the engaging portion 28 and extend in the vertical direction. As shown in FIG. 8, the duct 30 is located between the two pressing portions 29 in a state in which the pressing member 27 has been assembled on the cover 13.

Fixed pieces 31 to be fixed to the pressurizing member 22 are formed on the upper end portions of the two pressing portions 29. An insertion hole 33 into which a bolt 32 is inserted is formed through each fixed piece 31.

Among the pressurizing portions 24A and 24B of the pressurizing member 22, a fixing portion 34 for fixing the fixed pieces 31 of the pressing portion 29 is formed on the front end portion of the upper-side pressurizing portion 24A located on the upper side. Screw holes 35 into which the bolts 32 are screwed are formed on both the left and right end portions of the fixing portion 34. The screw holes 35 may be through holes having screw threads formed on their inner portions, the screw holes 35 may be formed through burring, or the screw holes 35 may be formed by press-fitting or welding nuts.

By screwing the bolts 32 into the screw holes 35 while the fixed pieces 31 overlap with the fixing portion 34, the pressurizing member 22 and the pressing member 27 are fixed, and the cover 13 is pressed from the front by the pressing member 27. Accordingly, the cover 13 is pressed on the exhaust surfaces 16 of the electricity storage elements 11 from the front.

Figure 9:
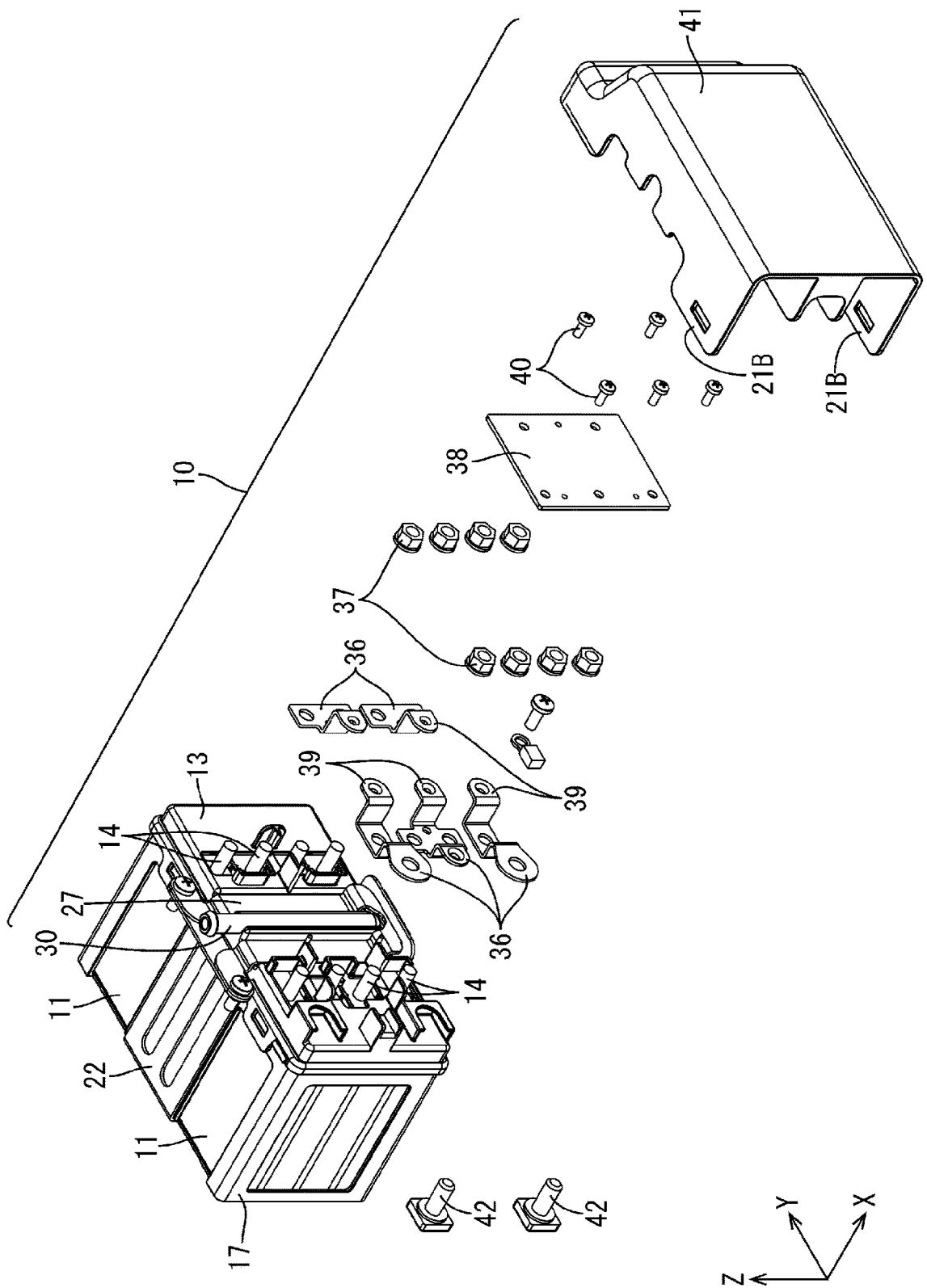
FIG. 9 is an exploded perspective view showing an electricity module.
Figure 10:
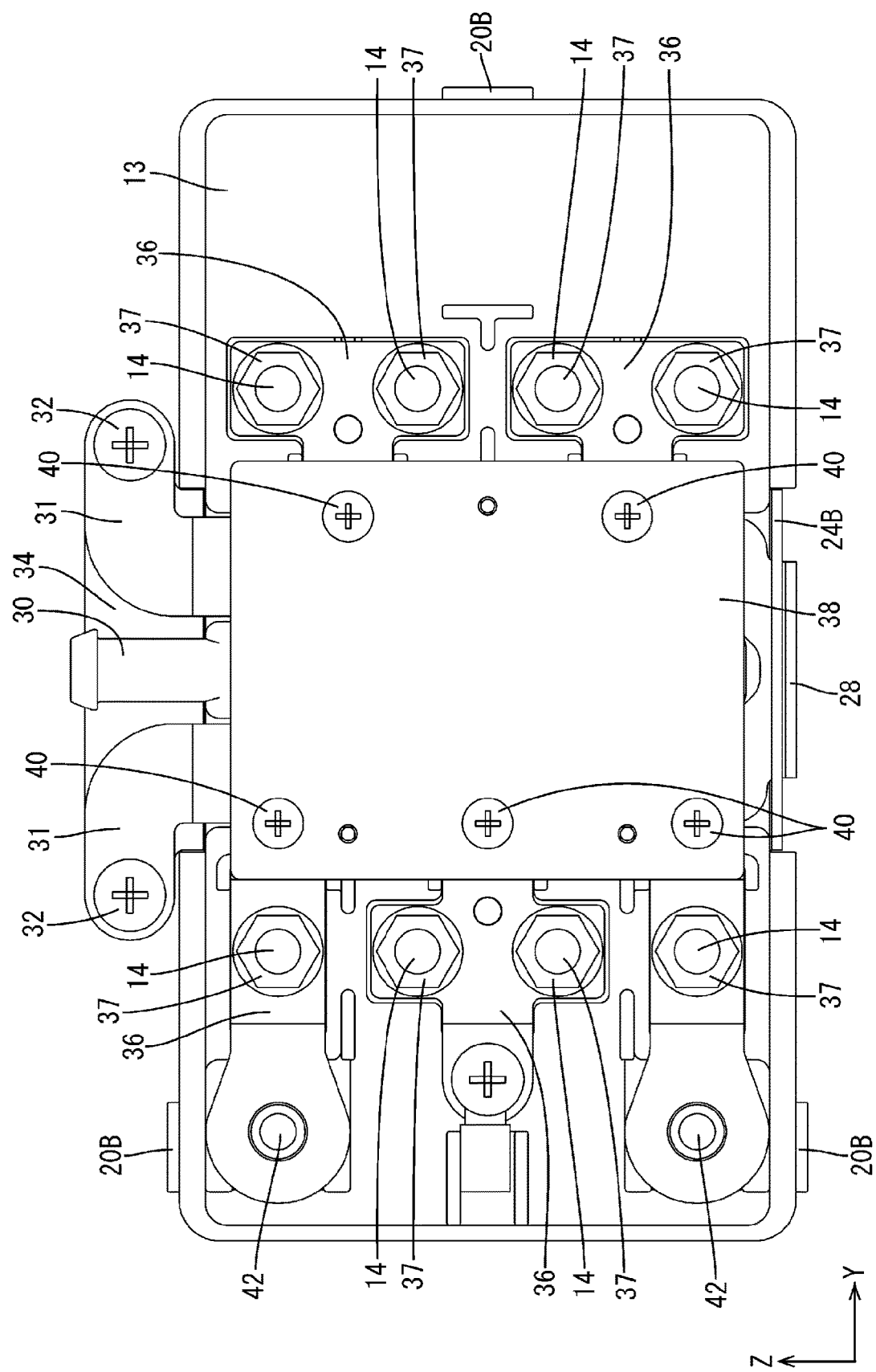
FIG. 10 is a front view showing a state in which an upper cover of an electricity storage module has been removed.

As shown in FIGS. 9 and 10, bus bars 36 made of metal are attached to the electrode terminals 14 of the electricity storage elements 11. Screw threads are formed on the outer circumferential surfaces of the electrode terminals 14, and due to the nuts 37 being screwed on the screw threads, the electrode terminals 14 and the bus bars 36 are electrically connected. The electrode terminals 14 of adjacent electricity storage elements 11 are electrically connected by the bus bars 36.

Substrate connection portions 39 that are connected to a circuit board 38 are provided in an extended manner on the bus bars 36. The substrate connection portions 39 and the circuit board 38 are fixed by bolts 40.

A circuit that determines the states (voltages, currents, temperatures, etc.) of the electricity storage elements 11 is formed in the circuit board 38.

Figure 11:
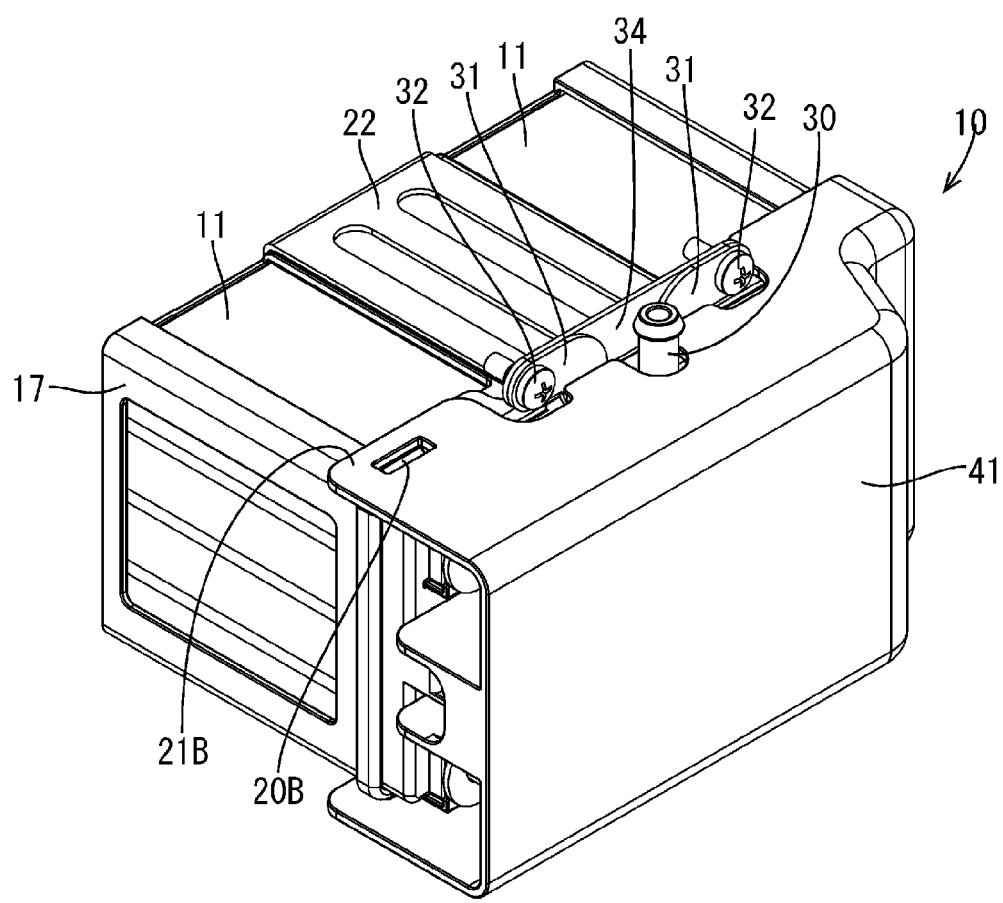
FIG. 11 is a perspective view showing an electricity module.

As shown in FIG. 11, an upper cover 41 is furthermore assembled on the cover 13 from the front. Due to the lock portions 20B formed on the cover 13 and the locked portions 21B formed on the upper cover 41 being engaged elastically, the cover 13 and the upper cover 41 are integrally assembled. When the upper cover 41 is assembled on the cover 13, the upper cover 41 covers the electrode terminals 14, the bus bars 36, and the circuit board 38 from the front. Accordingly, a case is suppressed in which foreign matter interferes with the electrode terminals 14, the bus bars 36, and the circuit board 38.

Among the bus bars 36, the bus bar 36 arranged on the lower end portion and the bus bar 36 arranged on the upper end portion are connected to external device connection terminals 42. The external device connection terminals 42 are connected to electrical conductors (not shown) such as wires and supply electricity to an external device (not shown).

As shown in FIG. 12, the exhaust ports 15 of the electricity storage elements 11 are formed recessed from the exhaust surfaces 16, and thus guide walls 43 (guide portions) with loop shapes that are closed so as to surround the exhaust ports 15 are formed around the exhaust ports 15. In the present embodiment, the exhaust ports 15 have circular shapes in a view from the front.

Figure 13:
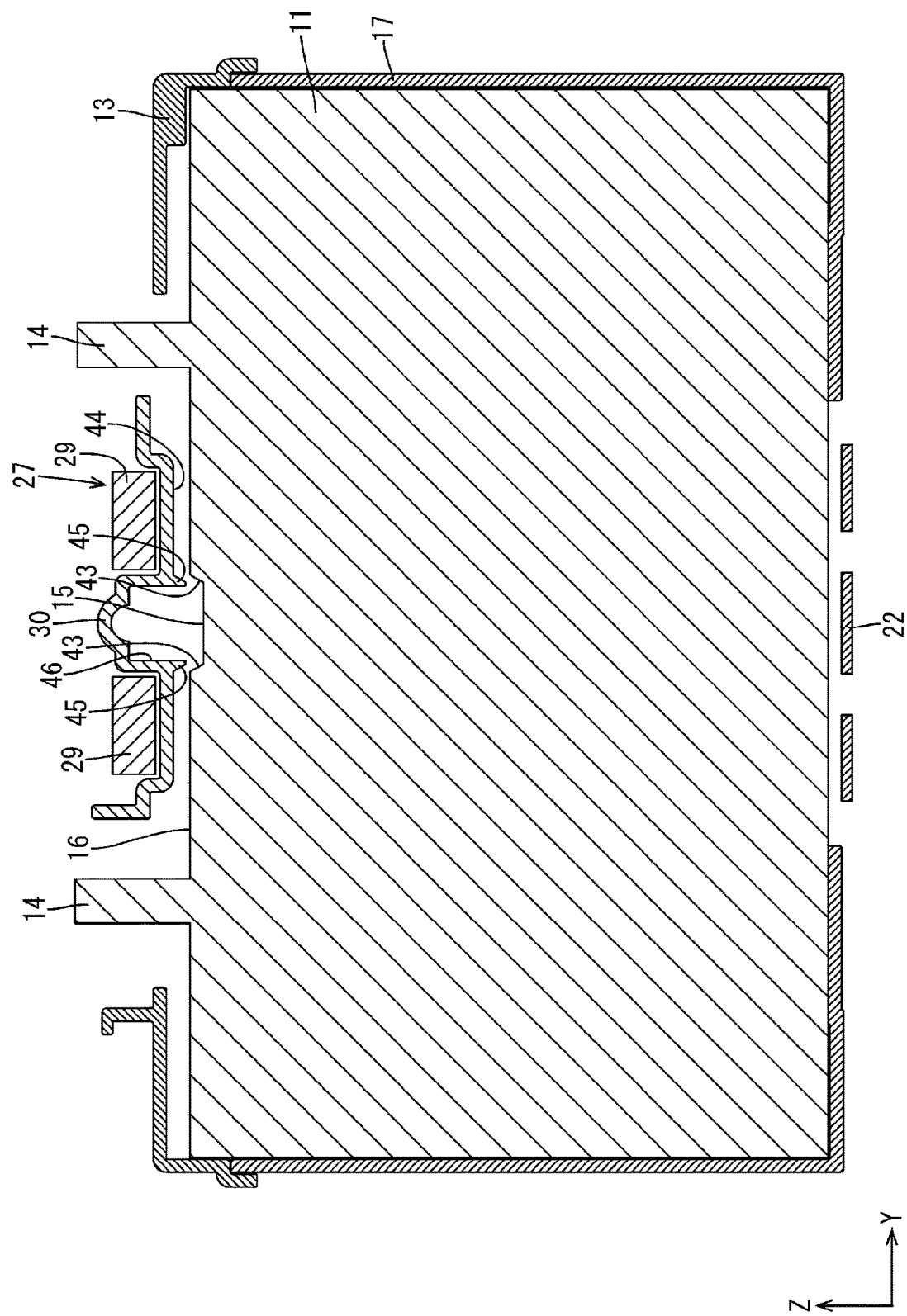
FIG. 13 is a cross-sectional view showing a state prior to when a pressing member presses an electricity storage element side.

As shown in FIG. 13, in the state in which the multiple electricity storage elements 11 are stored in the holding case 17 and the cover 13 is assembled on the holding case 17, guide ribs 45 (guided portions) that fit into the guide walls 43 are formed at positions of the cover 13 corresponding to the guide walls 43 on an opposing surface 44 that opposes the exhaust surfaces 16 of the electricity storage elements 11. In a view from the rear, the guide ribs 45 are formed into circular shapes.

Figure 14:
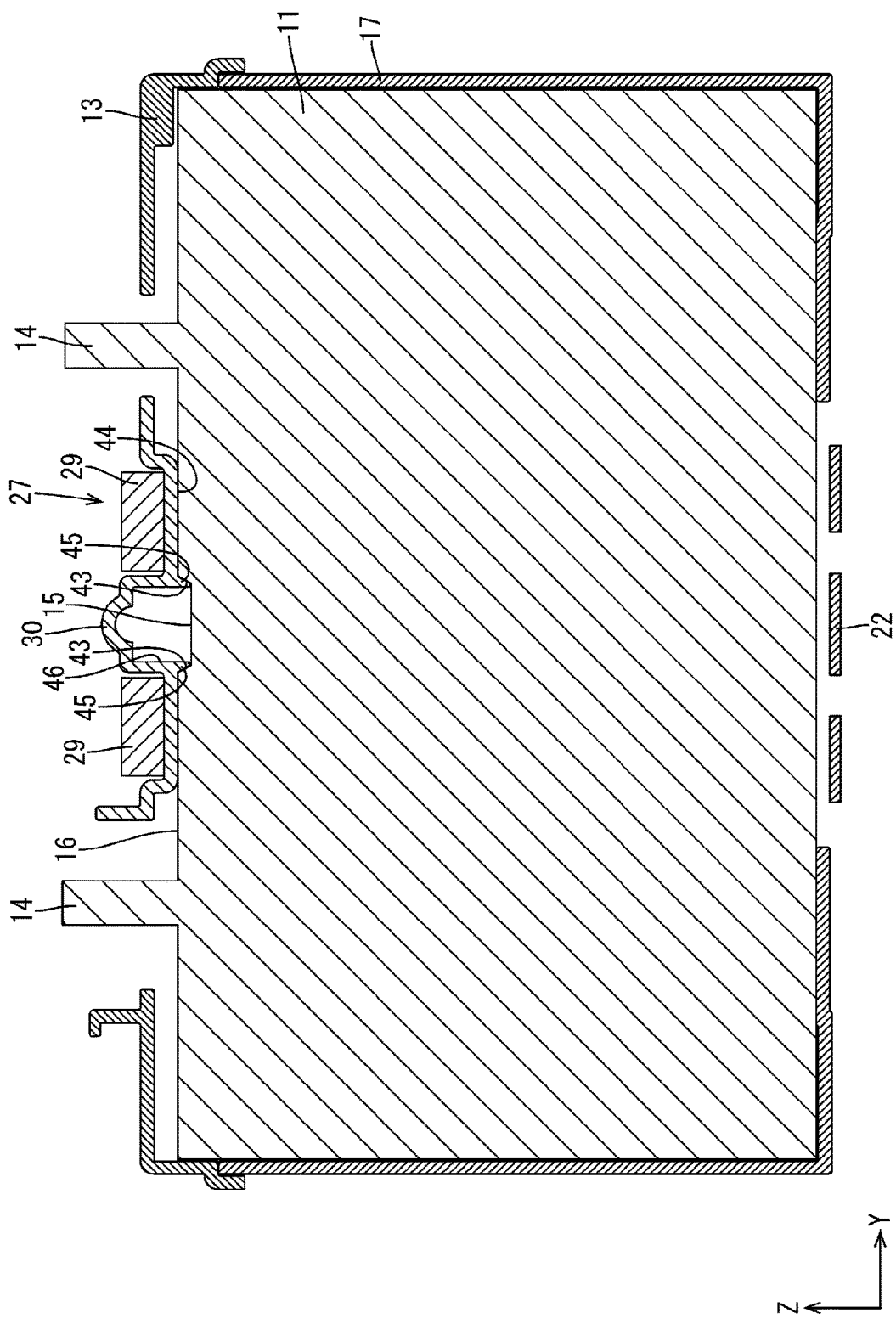
FIG. 14 is a cross-sectional view showing a state after when a pressing member presses an electricity storage element side.

As shown in FIG. 14, with the guide ribs 45 and the guide walls 43, the guide ribs 45 fit inside of the guide walls 43 due to the pressurizing member 22 being assembled on the holding case 17 and due to the pressing member 27 being assembled on the pressurizing member 22 from the cover 13 side and being fixed by the bolts 32. At this time, the outer surface of the guide ribs 45 come into close contact with the inner surfaces of the guide walls 43. Accordingly, the outer surfaces of the guide ribs 45 and the inner surfaces of the guide walls 43 are sealed.

A circular tube-shaped duct 30 that extends in the vertical direction is formed integrally on the cover 13. One end portion (in the present embodiment, the lower end portion) of the duct 30 is closed, and the other end portion (in the present embodiment, the upper end portion) is open. Another member such as a rubber pipe (not shown) is attached to the open end portion of the duct 30. Gas that has reached the open end portion through the duct 30 is guided to the outside of the vehicle through the rubber pipe or the like.

As shown in FIG. 15, communication ports 46 that communicate with the interior of the duct 30 are formed in regions on the inner sides of the guide ribs 45. Accordingly, gas that is discharged from the exhaust ports 15 of the multiple electricity storage elements 11 is passed through to the interior of the one duct 30.

Effects of the Embodiment

Next, effects of the present embodiment will be described. The electricity storage module 10 according to the present embodiment is an electricity storage module 10 including an electricity storage element group 12 composed of a plurality of electricity storage elements 11 having exhaust ports 15 that discharge gas produced therein, and a cover 13 attached to the electricity storage element group 12, wherein the electricity storage element group 12 has exhaust surfaces 16 on which the exhaust ports 15 are arranged, and the cover 13 is attached so as to cover the exhaust surfaces 16, guide walls 43 that surround the exhaust ports 15 in the form of loops are formed in the respective plurality of electricity storage elements 11, guide ribs 45 that come into close contact with the inner surfaces of the guide walls 43 and fit therein are formed on an opposing surface 44 of the cover 13 that opposes the exhaust surfaces 16, and the cover 13 is provided with a duct 30 that communicates with the exhaust ports 15 and through which gas discharged from the exhaust ports 15 passes.

According to the present embodiment, due to the guide walls 43 and the guide ribs 45 coming into close contact and fitting together, the inner surfaces of the guide walls 43 and the outer surfaces of the guide ribs 45 are sealed. Accordingly, it is not necessary to separately provide a member for sealing the guide walls 43 and the guide ribs 45, and therefore the number of parts can be reduced. As a result, it is possible to reduce the production cost of the electricity storage module 10.

Also, according to the present embodiment, a pressing member 27 that presses the cover 13 toward the electricity storage element group 12 is attached to the cover 13. Accordingly, since the guide ribs 45 can reliably be brought into close contact with the guide walls 43, it is possible to improve the property of sealing the gaps between the guide walls 43 and the guide ribs 45.

Also, according to the present embodiment, the electricity storage element group 12 is formed by the plurality of electricity storage elements 11 being aligned in the vertical direction, and a pressurizing member 22 that pressurizes the plurality of electricity storage elements 11 in the vertical direction is attached to the electricity storage element group 12. Accordingly, if gas is produced in the electricity storage elements 11 and the internal pressure increases, it is possible to use the pressurizing member 22 to suppress a case in which the electricity storage elements 11 swell.

Also, according to the present embodiment, the pressing member 27 is provided with the engaging portion 28, the pressurizing member 22 is provided with the engagement hole 26, and the engaging portion 28 elastically engages with the hole edge portion of the engagement hole 26. Accordingly, the pressing member 27 and the pressurizing member 22 are elastically engaged, and therefore it is possible to reliably press or pressurize the electricity storage element group 12.

Other Embodiments

The present invention is not limited to the embodiment described with reference to the description above and the drawings, and for example, embodiments such as the following are encompassed within the technical scope of the present invention.

(1) In the present embodiment, a configuration was used in which the guide walls 43 formed on the electricity storage elements 11 and the guide ribs 45 formed on the cover 13 are fit together, but there is no limitation to this. For example, it is possible to use a configuration in which the guide ribs are formed on the electricity storage elements and the guide walls are formed on the cover, and according to necessity, it is possible to employ any configuration as the configuration of the guide portions and the guided portions.

(2) The pressing member 27 may be omitted.
(3) The pressurizing member 22 may be omitted.

The invention claimed is:

1. An electricity storage module comprising:
   an electricity storage element group composed of a plurality of electricity storage elements having exhaust ports that discharge gas produced therein, each of the exhaust ports having a constant diameter so as to be continuously open; and
   a cover attached to the electricity storage element group,
   wherein the electricity storage element group has exhaust surfaces on which the exhaust ports are arranged, and the cover is attached so as to cover the exhaust surfaces,
   guide portions that surround the exhaust ports in the form of loops are respectively formed integrally on the exhaust surfaces of the plurality of electricity storage elements,
   guided portions that come into close contact with the guide portions are formed integrally on an opposing surface of the cover that opposes the exhaust surfaces, and
   the cover is provided with a duct that communicates with the exhaust ports and through which gas discharged from the exhaust ports passes.

2. The electricity storage module according to claim 1, wherein a pressing member that presses the cover toward the electricity storage element group is attached to the cover.

3. The electricity storage module according to claim 1, wherein the electricity storage element group is formed by the plurality of electricity elements being aligned in an alignment direction, and a pressurizing member that pressurizes the plurality of electricity storage elements in the alignment direction is attached to the electricity storage element group.

4. The electricity storage module according to claim 1, wherein
   a pressing member that presses the cover toward the electricity storage element group is attached to the cover,
   the electricity storage element group is formed by the plurality of electricity elements being aligned in an alignment direction, and a pressurizing member that pressurizes the plurality of electricity storage elements in the alignment direction is attached to the electricity storage element group, and
   the pressing member and the pressurizing member is provided with an engaging portion, the other is provided with an engagement hole, and the engaging portion elastically engages with a hole edge portion of the engagement hole.

5. The electricity storage module according to claim 2, wherein the electricity storage element group is formed by the plurality of electricity elements being aligned in an alignment direction, and a pressurizing member that pressurizes the plurality of electricity storage elements in the alignment direction is attached to the electricity storage element group.

6. The electricity storage module according to claim 2, wherein
   a pressing member that presses the cover toward the electricity storage element group is attached to the cover,
   the electricity storage element group is formed by the plurality of electricity elements being aligned in an alignment direction, and a pressurizing member that pressurizes the plurality of electricity storage elements in the alignment direction is attached to the electricity storage element group, and
   the pressing member and the pressurizing member is provided with an engaging portion, the other is provided with an engagement hole, and the engaging portion elastically engages with a hole edge portion of the engagement hole.

7. The electricity storage module according to claim 3, wherein
   a pressing member that presses the cover toward the electricity storage element group is attached to the cover,
   the electricity storage element group is formed by the plurality of electricity elements being aligned in an alignment direction, and a pressurizing member that pressurizes the plurality of electricity storage elements in the alignment direction is attached to the electricity storage element group, and
   the pressing member and the pressurizing member is provided with an engaging portion, the other is provided with an engagement hole, and the engaging portion elastically engages with a hole edge portion of the engagement hole.

8. The electricity storage module according to claim 1, wherein guide portions have an inner surface opposite of an outer surface, the inner surface and the outer surface of the guide portions being seated within the respective guided portions.

* * * * *